Jan. 22, 1957  J. S. GOODWIN  2,778,669
MAGNETIC FISHING TOOL
Filed Oct. 17, 1952  3 Sheets-Sheet 1
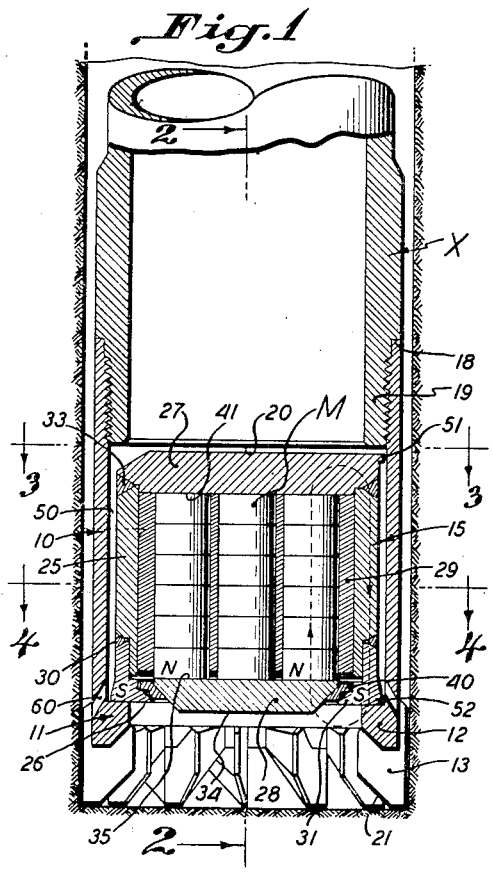
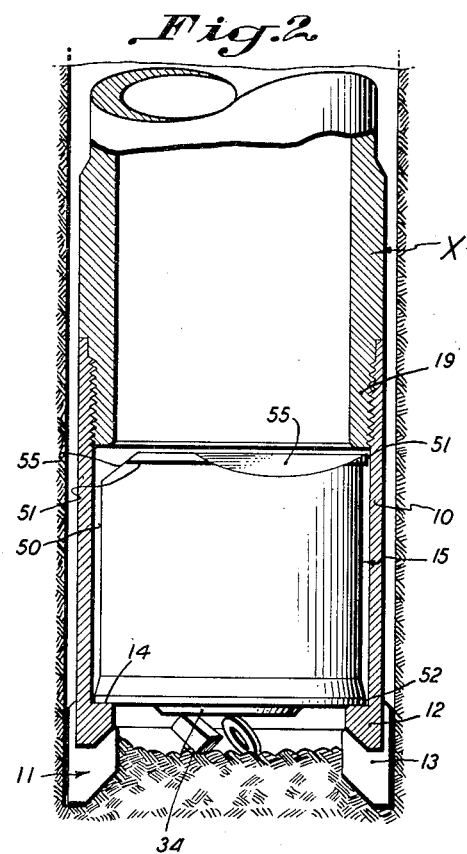
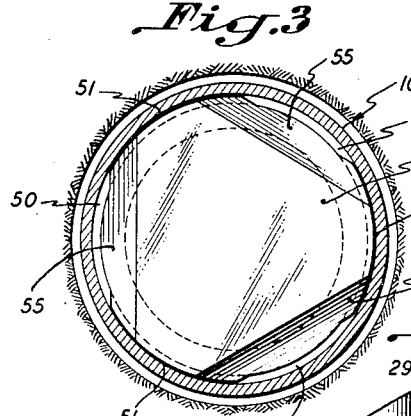
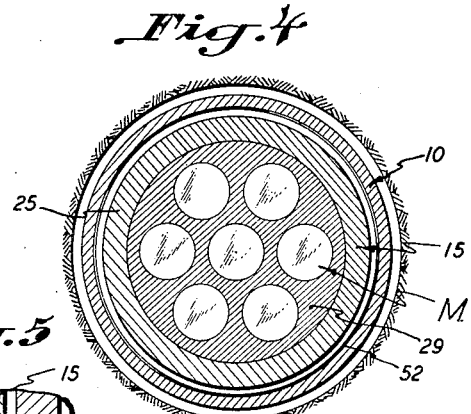
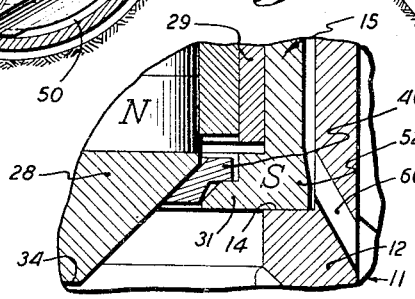
INVENTOR.
JOHN S. GOODWIN.
BY
Attorney.

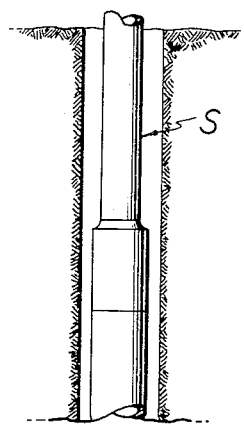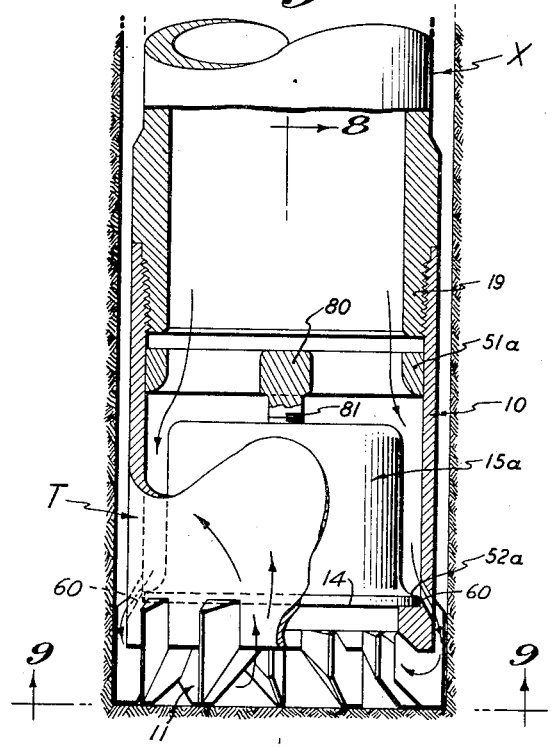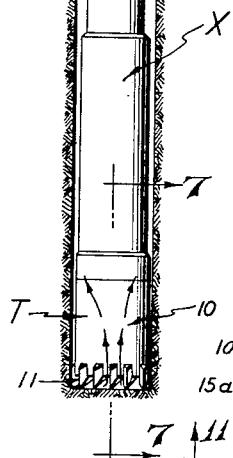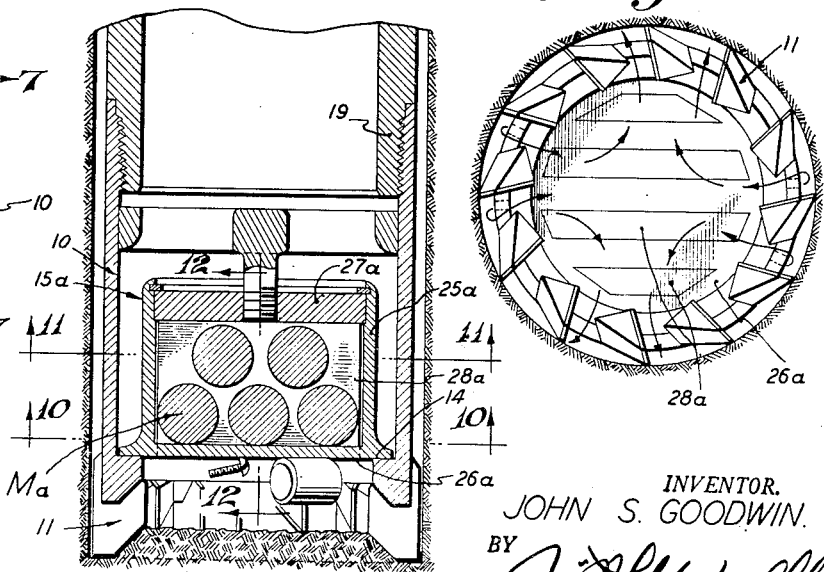

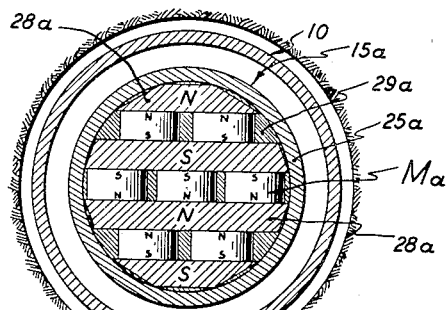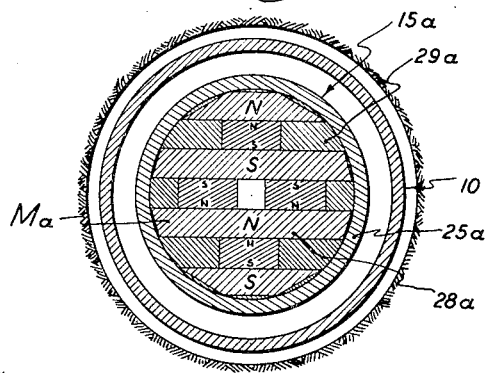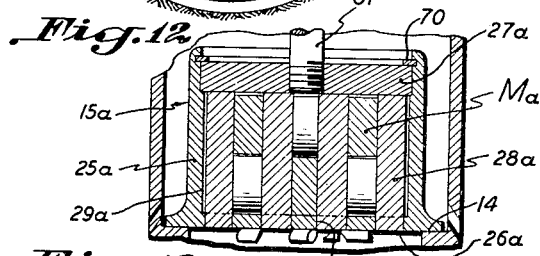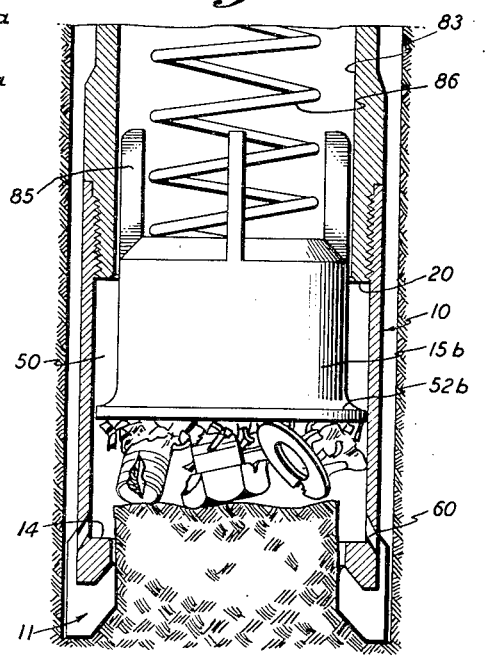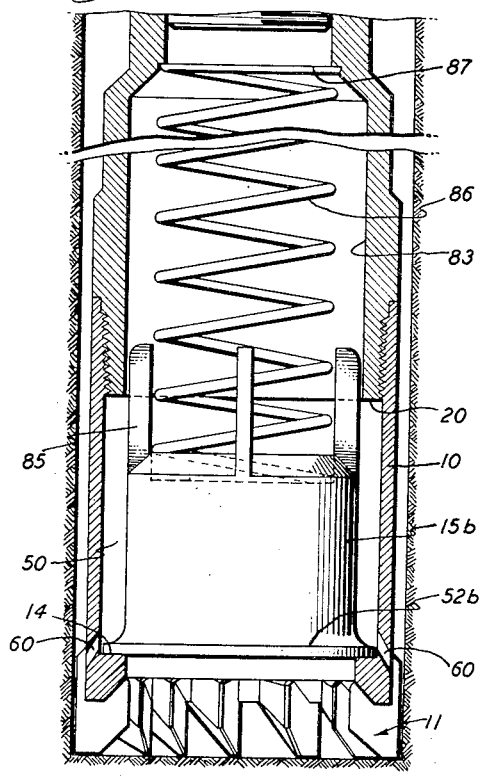

United States Patent Office 2,778,669
Patented Jan. 22, 1957

2,778,669

MAGNETIC FISHING TOOL

John S. Goodwin, Whittier, Calif., assignor to Globe Oil Tools Company, Los Nietos, Calif., a corporation of California Application October 17, 1952, Serial No. 315,256

13 Claims. (Cl. 294—65.5)

This invention has to do with a magnetic fishing tool and it is a general object of the invention to provide a simple, practical, improved tool adapted to be used on the lower end of a drilling string, or the like, and in an oil well to effect recovery of junk or lost parts from the well.

It is not uncommon that it becomes necessary to recover or remove junk or lost parts from wells, for example, oil wells, and for such service various fishing tools have been proposed and employed. Large or bulky parts to be recovered are in many cases more simple to remove than are small, loose pieces. For the purpose of recovering small loose parts such, for example, as small tools or parts thereof, bolts, and other machine parts commonly manufactured of steel or iron, magnetic fishing tools have been proposed and used. In general this type of fishing tool is characterized by electromagnetic means and, as a result of this, operation of the tool requires not only the handling of the tool by a drilling string or cable, but also the handling of a line to supply the necessary energy to the tool. Furthermore, fishing tools of the general character referred to are, for the most part, bulky and there is little or no possibility of effecting a removal of the lost parts by other than simple, magnetic action.

It is a general object of this invention to provide a magnetic fishing tool wherein a magnetic pick-up unit is combined with an annular cutter or drilling head to be, in effect, within the head, and which is such that the head may be employed to cut or loosen parts lodged in the well while the pick-up unit catches and holds such parts so they are removed from the well as the tool is removed.

It is another object of this invention to provide a magnetic fishing tool of the general character referred to characterized by a handling of circulating fluid so that the fishing operation, that is, the dislodging of the stuck parts and the operation of the magnetic pick-up unit are effectively aided or supplemented by circulation of fluid occurring in the well where the fishing operation takes place.

It is another object of this invention to provide a fishing tool of the general character referred to wherein there is a body of simple, sturdy construction, terminating at a drilling head which is annular in form and wherein there is a magnetic pick-up unit within the body mounted so that it is secured and of such form as to be highly effective as a means of catching and holding lost parts.

It is a further object of this invention to provide a magnetic fishing tool of the general character referred to including a simple, practical, improved, magnetic pick-up unit which is, in effect, an insert readily applicable to a tubular body with a drilling head thereon, which body and head are of established practical form and construction.

The tool as provided by the present invention is adapted to be applied to the lower end of a drill string, for instance, to a collar on a drilling string, and it includes a body tubular in form and adapted to be coupled or connected to the collar. The lower end portion of the body is in the form of, or carries, an annular part, or ring, which is preferably the ring of a bit head. An annular series of circumferentially spaced teeth is carried by and projects from the ring, preferably downwardly therefrom, and radially outward therefrom. The ring projects somewhat inward from the body at the lower end thereof. The pick-up unit is carried in the body between the ring of the bit head and the lower end of a coupler or barrel that connects the body and collar. The pick-up unit is preferably free to rotate and possibly shift vertically in the body. In accordance with the invention the pick-up unit is characterized by a case having a cylindrical shell portion, a cap at the lower end of the shell portion, and a cover at the upper end of the shell portion. Parts at the upper and lower ends of the case preferably guide the case in the body and serve to hold it substantially central of the body. One or more permanent magnets is provided in the case and energized parts exposed at the lower end of the case, so that parts to be fished that enter the drill head are picked up and held by the magnetic unit. The magnetic unit has an outside diameter smaller than the inside diameter of the body, with the result that there is an annular fluid handling passage in communication with the drill string and extending to the bit head, and at the bit head there are diametrically opposite flow directing ports, preferably directing flow downward and outward between teeth of the drill head. As a result of this, as the fishing operation is carried out, fluid can be circulated down through the tool to issue at diametrically opposite points and thus flow down and in and then out to discharge up between the teeth of the drill head that occur between those at which the ports are located. The action of the circulating fluid supplements that of the drill head, and these two factors supplement the action of the pick-up unit.

The various objects and features of my invention will be fully understood from the following detailed description of typical preferred forms and applications of my invention, throughout which description reference is made to the accompanying drawings, as follows:

On sheet 1 there is illustrated one form of the invention in which Fig. 1 shows a tool embodying the present invention carried on the lower end of a drilling string, parts being shown in section and the section being taken to illustrate the diametrically opposite ports that deliver circulating fluid to the drill head; Fig. 2 is a view similar to Fig. 1, taken as indicated by line 2—2 on Fig. 1, showing the magnetic unit in elevation; Fig. 3 is a plan section taken as indicated by line 3—3 on Fig. 1; Fig. 4 is a plan section taken as indicated by line 4—4 on Fig. 1, and Fig. 5 is an enlarged view of a portion of the structure shown in Fig. 1.

On sheets 2 and 3 of the drawings other forms of the invention are illustrated, Fig. 6 illustrating a drilling string carrying a tool embodying the invention showing the manner in which it operated in a well, which tool may be any of the several different forms illustrated; Fig. 7 is a view illustrating a form of the invention somewhat different from that shown on sheet 1, the view being a side elevation with certain parts broken away to show in section; Fig. 8 is a detailed, vertical, sectional view of the structure shown in Fig. 6, being a view taken as indicated by line 8—8 on Fig. 7; Fig. 9 is a bottom, end view of the structure shown in Figs. 6 and 7, being a view taken as indicated by line 9—9 on Fig. 7; Fig. 10 is a transverse, sectional view taken as indicated by line 10—10 of Fig. 8; Fig. 11 is a transverse, sectional view taken as indicated by line 11—11 on Fig. 8; Fig. 12 is a view taken substantially as indicated by line 12—12 on Fig. 8; Fig. 13 is a view illustrating another form of the invention, being a vertical, sectional view in which the magnetic pick-up unit is shown in elevation, and Fig. 14 is a view similar to Fig. 13 showing the parts in a position other than that shown in Fig. 13.

The fishing tool as provided by the present invention is adapted to be mounted on or carried by a drilling string, or the like, and in the drawings the tool T is shown mounted on a drill string S through attachment to a collar A on the lower end of the string. The tool T includes, generally, a tubular or cylindrical body 10 shown mounted on the lower end of the collar A by means of a coupler or barrel X. A bit head 11 is provided at the lower end of the body and includes a ring 12 on the body 10 and a plurality of teeth 13 which project from the ring, preferably downwardly and also radially outward therefrom. The tool further includes a magnetic pickup unit 15 located in the body 10 where it is confined between the ring 12 and a part of the coupler X and the construction generally is such as to provide for the handling of circulating fluid introduced through the string so that it is discharged downwardly and outwardly at the lower end of the tool, preferably between teeth 13, at diametrically opposite sides of the drill head.

The drilling string S may vary widely in form and construction and it is preferably such as to effectively carry the fishing tool and to handle fluid for circulation to the fishing tool. A suitable collar A is provided at the lower end of the drilling string S and is between the fishing tool and the drill pipe sections which make up the drilling string. In the case illustrated the coupler X is connected to the lower end of the drill collar A and the body is connected to the lower end of the coupler.

The body 10 of the fishing tool is preferably a simple, tubular part, the upper end of which has threaded engagement with the pin 19 which depends from the coupler X. Through this construction the lower end 20 of the pin 19 occurs in the body 10 and faces downwardly therein.

The drill bit head 11 provided on or occurring at the lower end of body 10 is preferably a simple annular structure, and in a typical case it is made up of the ring 12 and teeth 13. In the case illustrated the ring 12 is a part of or integral with the body 10 and projects somewhat inward from the body to have a top 14 that faces upwardly.

The teeth 13 may, in practice, vary in form, number and construction. In fact, they may be all alike or they may be varied, as circumstances require. In a typical case such as is illustrated in the drawings, the teeth are circumferentially spaced and are substantially alike, and they project axially of the structure or downward from the ring 12 and also radially outward therefrom. The teeth, as illustrated in the drawings, have their inner lower corners beveled, as at 21.

In accordance with the present invention the pick-up unit 15 of the fishing tool is located within the body 10 between the ring 12 and the coupler X. In the drawings several different forms of pick-up unit are illustrated and in the first form, that is on sheet 1 of the drawings, the unit illustrated includes a case made up of a cylindrical shell 25, a lower end cap 26 at the lower end of the shell, and an upper end cap 27 at the upper end of the shell. In this form of the invention a head 28 is provided at the lower end of the unit and one or more permanent magnets M in the case energize the head 28. A filler 29 of non-magnetic material holds the magnet or magnets M in the case spaced from the shell 25, while in engagement with the head 28 and the cap 27.

The shell 25 is preferably a simple, cylindrical part and the cap 26 at the lower end of the shell is preferably an annular element fixed to the lower end of the shell, as by welding 30, or the like, and it is preferably formed to have a lip portion 31 that projects radially inward.

The upper end cap 27 at the top of the shell is preferably a simple, imperforate disc fixed to the upper end of the shell, as by welding 33, so that it closes the shell at this point.

The head or drill bit head 28 is of magnetic material, as are the shell 25 and the caps 26 and 27. In its preferred form the head 28 is a simple flat disc with a bottom face 34 and a top face 35. In the case illustrated the edge or peripheral portion of the head 28 is beveled so that the bottom face 34 is somewhat smaller in diameter than the top face 35.

In accordance with this form of the invention the head 28 is supported by the case so that it is out of contact with the cap 26 which retains it. In the particular case illustrated an insert 40 of non-magnetic material occurs between the lip 31 of cap 26 and the peripheral portion of head 28. The insert 40 seats downwardly on the lip and preferably has a beveled inner part that fits the periphery of the head 28, as clearly shown in Fig. 1 of the drawings. In the preferred form of the invention several magnets M are provided in the case of unit 15, and in the form of the invention illustrated the several magnets M are alike and each is round in cross section and elongate in form, and is shaped and proportioned so that its lower end seats directly on the top 35 of head 28 while its upper end seats against the bottom 41 of cap 27. In the particular case illustrated each magnet M is made up of a plurality of sections which seat accurately one against the other, and in practice the magnet sections are ground and accurately seated one against the other, while the lower end of each magnet is ground and seated against the ground top face 35 of head 28, while the upper end is ground and seated against the ground lower face 41 of cap 27.

The filler 29 serves primarily to hold the magnets M properly spaced apart or located in the case and spaced from the shell 25 of the case. The filler may be a unitary body of non-magnetic material and in practice lead has been employed for this purpose. From the foregoing description it will be apparent that the construction provided established the head 28 of one magnetic polarity while the cap 26, and, to a degree, the ring 12 and the teeth thereon, are of the opposite magnetic polarity.

In accordance with the present invention the shell 25 of the pick-up unit 15 is round in cross-section and is smaller in diameter than the interior of the body 10, so that there is an annular space 50 between these parts establishing a flow passage in the body 10 from the upper end of the case to the lower end thereof. In practice it is preferred that an upper guide member 51 be provided at the upper end portion of the unit 15 to support or guide the unit centrally in the body while a guide member 52 is provided at the lower end of the case to likewise guide that part of the case centrally in the body. In the form of the invention under consideration the guide parts 51 and 52 are simple flanges projecting radially outward from the case and slidably fitting the interior of body 10. In accordance with the invention a plurality of circumferentially spaced recesses 55 are provided in the upper portion of the unit 15, for instance, in the cap 27 on which the guide 51 is formed so that there is adequate connection or communication between the interior of tubular coupler X and the annular space 50.

The invention provides fluid handling ports 60 at the lower end of body 10 or where ring 12 joins body 10, and in the preferred arrangement one or more such ports occur at one side of the body while one or more such ports occur at the diametrically opposite side of the body. In the preferred construction the ports occur between adjacent teeth 13 and they are pitched or inclined so that they extend downwardly and outwardly, as clearly illustrated in the drawings. The inner ends of the ports 60 are open to or are in communication with the annular space 50, while the lower ends of the ports are open to discharge downwardly and outwardly into the well bore in which the bit head is located.

With the construction provided by the present invention the fishing tool T, fixed to the lower end of the drill string S, can be lowered into the well, as, for instance, to the bottom thereof, where parts are to be recovered. To carry out the fishing operation the string S can be rotated so that the bit head 11 turns and the teeth thereof dislodge parts that might otherwise be stuck in the well. At the same time fluid can be circulated through the drill string to pass through the collar, the coupler X and the annular space 50 in the body 10. This fluid is discharged through the ports 60 at diametrically opposite parts of the bit head, and thus washes down and then in, causing parts to be washed inward toward the center of the hole so that they are positioned to be caught and held by the magnetic head 28. As the opposed streams of fluid thus wash toward the center of the hole, their velocity is dissipated and the fluid disperses and finds its way up and out between teeth located between those at which the ports are located.

It will be thus apparent that with the construction provided the fishing action is carried out by a combination of the dislodging action gained by the bit head 11, the washing action gained by the circulation of fluid, and the magnetic action gained through the pick-up unit 15.

The flow or washing action gained by the circulating fluid is indicated in the drawings, and in particular in Figs. 6, 7, and 9 of the drawings, and in Fig. 9 of the drawings pairs of ports 60 at diametrically opposite sides of the bit head indicate fluid being discharged to flow inward toward the center of the hole, which fluid then diverges to flow up and out between the teeth where there are no ports 60.

In Figs. 7, 8, 10, 11, and 12 of the drawings there is a somewhat different form of pick-up unit illustrated and in this case the pick-up unit 15$^a$ includes a case made up of a cylindrical shell 25$^a$, a lower end cap 26$^a$ and a top end cap 27$^a$. These parts of the case are preferably all of non-magnetic material. The lower end head 26$^a$ may be an integral part of or formed with the case 25$^a$ while the top cap 27$^a$ is detachable and is suitably retained as by means of a split ring 70. A plurality of permanent magnets M$^a$ are located in the case. These magnets are disposed transversely of the structure and are confined between magnet heads 28$^a$, which are spaced, vertically disposed plates with lower end portions projecting downwardly through or in openings 71 provided in cap 26$^a$. In the particular case illustrated the lower ends of the head plates 28$^a$ terminate flush with the bottom of cap 26$^a$. In the particular case illustrated there are several head plates 28$^a$ and several groups of magnets between these plates. It is to be understood that the magnets are arranged and related relative to the plates so that adjacent plates are of opposite magnetic polarity. In practice the several magnets M$^a$ included in the structure are suitably held in place relative to the plates and, if desired, a filler 29$^a$ of non-magnetic material may be included in the structure to hold the magnets in place relative to the plates.

In this form of the invention the case of the magnetic unit 15$^a$ has a guide part 51$^a$ at the upper end of the structure guiding the pick-up unit in the body 10, and it has a guide part 52$^a$ at the lower end of the pick-up unit guiding it in the body 10. The body 10 and the drill head thereon may, in this form of the invention, be the same as that first described. The guide 51$^a$ in the form of the invention under consideration instead of being a simple flange on the case of the pick-up unit is an annular part slidable in the body 10 and provided with a transverse web 80 with a stem 81 depending from it and attached to the cap 27$^a$, as by means of a threaded connection.

From the drawings and from the foregoing descriptions it will be apparent that the form of the invention just described operates substantially the same as that first described, in that as the fishing operation is carried out the bit head may serve to dislodge parts while the circulation of fluid serves to wash parts in toward the center of the structure and to a position where they are picked up and held by the magnetic head plates 28$^a$.

In the form of the invention illustrated in Figs. 13 and 14, the structure is similar, generally, to that hereinabove described, except that the pick-up unit 15$^b$ is located not only for rotation in the body 10 but also for substantial movement vertically therein. In this case the collar A or the coupler X on the collar A has an enlarged or counterbored lower end portion 83 and the case of the pick-up unit, instead of being confined between the ring of the bit head and the lower end 20 of the coupler, is adapted to slide upwardly into the counterbore 83. Guide fingers 85 project upwardly from the unit 15$^b$ to guide the unit in the counterbore, and a helical compression spring 86 abutting a downwardly facing shoulder 87 at the upper end of the counterbore, bears on the top of the pick-up unit and normally yielding urges it downwardly. Guide flange 52$^b$ is provided at the lower end of the pick-up unit so that the unit is guided at its lower end, and when the magnetic unit is forced off bottom, as shown in Fig. 14, the discharge ports 60 are cut off by the flange, thus stopping or restricting flow of fluid and indicating to the driller the fact that the magnetic unit has been raised in the body by contact with an object in the well. So far as the present invention is concerned the details of the pick-up unit 15$^b$ may be of the type illustrated in Fig. 8, as circumstances may require.

With the form of the invention just described material is caught by the pick-up unit and the material caught may be crowded up in the body 10 to be packed and held therein. A substantial amount of material may be caught and held, depending upon operating conditions.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A well fishing tool to be applied to a drill string including, a tubular body attached to the lower end of the string to depend therefrom, the body having an annular toothed head at the lower end thereof with an upwardly facing top within the body and having downwardly disposed ports therein at the lower end portion thereof and above the head, and a self-contained magnetic pick-up unit supported within the body and seated on said top and with a head exposed at the lower end portion of the body of the unit and having opposite magentic poles to catch and hold parts loose in the well, the unit being spaced in the body establishing a passage in the body between the exterior of the unit and the interior of the body and connecting the string and the ports.

2. A well fishing tool to be applied to a drill string including, a tubular body attached to the lower end of the string to depend therefrom, the body having an annular toothed head at the lower end thereof with an upwardly facing top within the body, and having downwardly disposed ports therein at the lower end portion thereof and above the head, and a self-contained magnetic pick-up unit supported within the body and seated on said top and with a head exposed at the lower end portion of the body of the unit and having opposite magnetic poles to catch and hold parts loose in the well, the unit being spaced in the body establishing a passage in the body between the exterior of the unit and the interior of the body and connecting the string and ports, the unit being confined in the body by and between the string and the head.

3. A well fishing tool to be applied to a drill string including, a tubular body attached to the lower end of the string to depend therefrom, the body having an annular toothed head at the lower end thereof with an upwardly facing top within the body, and having ports therein at the lower end portion thereof, and a self-contained magnetic pick-up unit supported within the body and seated on said top, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and the ports, the unit including a permanent magnet magnetizing the said magnetic poles of the unit.

4. A well fishing tool to be applied to a drill string including, a tubular body attached to the lower end of the string to depend therefrom, the body having an annular toothed head at the lower end thereof with an upwardly facing top within the body, and having downwardly disposed ports therein at the lower end portion thereof and above the head, and a self-contained magnetic pick-up unit supported within the body and seated on said top, a head carried by and exposed at the lower end portion of the body of the unit and having opposite magnetic poles to catch and hold parts loose in the well, the unit having a case spaced in the body establishing a passage in the body between the exterior of the unit and the interior of the body and connecting the string and the ports and a permanent magnet in the case magnetizing said magnetic poles of the unit.

5. A well fishing tool to be applied to a drill string including, a tubular body attached to the lower end of the string to depend therefrom, the body having an annular head at the lower end thereof, and having downwardly disposed ports therein at the lower end portion thereof and above the head, and a self-contained magnetic pick-up unit supported within the body, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and the ports, the head at the lower end of the body having an annular ring portion with teeth thereon and having an upwardly facing top within the body for supporting the unit in the body.

6. A well fishing tool to be applied to a drill string including, a tubular body attached to the lower end of the string to depend therefrom, the body having an annular toothed head at the lower end thereof with an upwardly facing top within the body, and having downwardly disposed ports therein at diametrically opposite parts of the power end portion thereof and above the head, and a self-contained magnetic pick-up unit supported within the body and seated on said top, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and the ports, the ports being disposed above the lower end of the unit to direct streams of fluid down and outwardly between teeth of the head at the exterior of the body.

7. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, and a cylindrical self-contained magnetic pick-up unit supported within the body and seated on said top, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and ports, the unit being free to turn in the body.

8. A well fishing tool to be applied to a drill string including, a cylindrical tubular body attached to the lower end of the string to depend therefrom, the body having an annular toothed head at the lower end thereof with an upwardly facing top within the body, and having downwardly and outwardly disposed ports therein at the lower end portion thereof and above the head, and a cylindrical self-contained magnetic pick-up unit supported within the body and seated on said top, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and ports, the unit being free to turn in the body and having guide parts thereon that maintain the unit substantially central in the body.

9. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, and a cylindrical self-contained magnetic pick-up unit supported within the body and seated on said top, a head carried by and exposed at the lower end portion of the body of the unit and having opposite magnetic poles to catch and hold parts loose in the well, the unit being spaced in the body establishing a passage in the body between the exterior of the unit and the interior of the body and connecting the string and the ports, the unit having a recessed guide flange at the upper end thereof centralizing the unit in the body.

10. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, and a cylindrical self-contained magnetic pick-up unit supported within the body and seated on said top, a magnetized head carried by and exposed at the lower end portion of the body of the unit to catch and hold parts loose in the well, the unit being spaced in the body establishing a passage in the body between the exterior of the unit and the interior of the body and connecting the string and the ports, the unit having guide fingers projecting from the upper end thereof and engaging in the interior of the cylindrical body to centralize the unit therein.

11. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, a cylindrical self-contained magnetic pick-up unit supported within the body and seated on said top, a magnetized head carried by and exposed at the lower end portion of the body of the unit to catch and hold parts loose in the well, the unit being spaced in the body establishing a passage in the body between the exterior of the unit and the interior of the body and connecting the string and the ports, and a spring within the body and engaging the unit and normally yieldingly urging it downwardly into seating engagement with said top.

12. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, and a cylindrical self-contained magnetic pick-up unit supported within the body and seated on said top, a magnetized head exposed at the lower end portion of the body of the unit to catch and hold parts loose in the well, the unit being spaced in the body establishing a passage in the body between the exterior of the unit and the interior of the body and connecting the string and the ports, the unit including a plurality of elongate, vertically disposed, permanent magnets the lower ends of which are in magnetic connection with said head of the unit.

13. A well fishing tool to be applied to a drill string including, a cylindrical tubular body attached to the lower end of the string to depend therefrom, the body having an annular toothed head at the lower end thereof with an upwardly facing top within the body, and having downwardly disposed ports therein at the lower end portion thereof and above the head, and a cylindrical self-contained magnetic pick-up unit supported within the body and seated on said top, a magnetized head exposed at the lower end portion of the body of the unit to catch and hold parts loose in the well, the unit being spaced in the body establishing a passage in the body connecting the string and the ports, the unit including a vertical plate in the unit with said part of the unit at the lower end thereof, and a plurality of permanent magnets in the unit magnetizing said plate.

References Cited in the file of this patent

UNITED STATES PATENTS

| | | |
|---|---|---|
| 1,451,268 | Morgan et al. | Apr. 10, 1923 |
| 1,484,090 | Simmons | Feb. 19, 1924 |
| 2,431,361 | Athy | Nov. 25, 1947 |
| 2,522,294 | Noble | Sept. 12, 1950 |
| 2,668,077 | Kirby | Feb. 2, 1954 |